Oct. 18, 1966     F. W. PEMENT     3,279,241

HYDROGEN GAUGE

Filed June 26, 1963

INVENTOR
Fredric W. Pement
BY
ATTORNEY

United States Patent Office 3,279,241
Patented Oct. 18, 1966

3,279,241
HYDROGEN GAUGE
Fredric W. Pement, Pittsburgh, Pa., assignor to Westinghouse Electric Corporation, Pittsburgh, Pa., a corporation of Pennsylvania
Filed June 26, 1963, Ser. No. 290,838
5 Claims. (Cl. 73—23)

This invention relates to a device for measuring hydrogen concentration, and more particularly to a device of the character described for measuring the concentration of hydrogen dissolved in water or in other fluid media, together with the method for so doing.

In U.S. Patent No. 3,040,561, assigned to the assignee of the present application, a hydrogen gauge which is capable of analyzing variations in hydrogen concentration in water or the like solvents is described. The gauge includes, as an essential element, a first wire wound about a mandrel which extends into the hydrogen-bearing solution, the wire being formed from palladium, or other similar material, which has the property of changing electrical resistance in response to changes in environmental hydrogen concentration. Also wound about the mandrel is a second wire which does not change resistance as a function of environmental hydrogen, but which has substantially the same temperature coefficient of resistance as the palladium or the like wire, the arrangement being such that by electrically comparing the electrical resistances of the respective wires, the hydrogen concentration can be determined independently of environmental temperature variations.

The principle of operation of the gauge described in U.S. Patent No. 3,040,561 lies in the phenomenon that palladium absorbs hydrogen a form a homogenous single phase-palladium-hydrogen solid solution at the normal operating conditions of the device, the increase in resistance of the palladium-hydrogen solid solution over the zero-hydrogen resistance of the palladium being proportional to the amount of hydrogen in the palladium-hydrogen solid solution. Consequently, the increase in resistance is also proportional to the concentration of hydrogen in the water or other solution surrounding the palladium when both hydrogen solutions are in equilibrium with each other. However, under certain conditions of temperature and environmental hydrogen concentration the equilibrium palladium-hydrogen solid solution may consist totally or partially of a second phase, the $\beta$-phase. The formation of the $\beta$-phase is undesirable inasmuch as the resistance of the palladium wire is varied and the calibration of the device is altered. That is to say, when the $\beta$-phase forms, the readings obtained from the gauge are erratic and cannot be related to the hydrogen concentration in the solution. Prior to this invention no practical means was known for preventing the $\beta$-phase solid solution from forming in the palladium. As a result, the palladium sensing element would necessarily have to be replaced or recalibrated as to response and reliability after the $\beta$-phase had been formed in order to continue hydrogen concentration readings.

With the present invention, there is provided a means for establishing the palladium sensing element in its zero-hydrogen condition under the conditions actually encountered by the device during use in determining dissolved hydrogen concentrations. The present invention provides means for accomplishing the establishment of the zero-hydrogen condition without removing the device from its normal installation and without a necessity of altering the prevailing environmental conditions, including the dissolved hydrogen concentration. Such a procedure enables one to determine conveniently and at any desired frequency the effective zero-hydrogen resistance of the palladium sensing element at the same conditions the palladium is used for the hydrogen concentration determinations. The latter procedure is valuable for periodic recalibrations of the instrument such as are normal standard practice or such as might be necessitated by long term changes in the true zero hydrogen palladium resistance. In addition, initial calibration of the gauge indications against known concentrations of dissolved hydrogen, as measured by independent methods, are not, in principle, needed and may actually be dispensed with once the effective zero-hydrogen palladium resistance, in situ, is known, a condition which the present invention provides.

As an object, the present invention seeks to provide apparatus for preventing formation of the undesirable $\beta$-phase solid solution in the palladium sensing element of a hydrogen gauge.

Another object of the invention is to provide an apparatus for increasing the rate at which the palladium sensing element of the hydrogen gauge will absorb hydrogen.

A further object is to provide a resistance type hydrogen measuring apparatus wherever the zero-hydrogen resistance of the apparatus can be conveniently determined.

In accordance with one aspect of the invention, means are provided for applying an electric current between the palladium sensing element of a hydrogen gauge and a suitable ground in such a manner that the palladium is anodic with respect to ground. It has been found that in this manner hydrogen will be forced out of the palladium when the palladium is anodic and that entry or reentry of hydrogen into the palladium is not possible while the palladium is maintained anodic. The values of the anodizing procedure are that (1) formation of second, $\beta$-phase hydrogen-palladium solid solution may be prevented, and that (2) the palladium may be restored to its zero-hydrogen condition while the device is maintained in hydrogen-bearing water or the like. It is, therefore, possible to determine the zero-hydrogen palladium resistance at any time after installation of the device without removing the palladium from its hydrogen-containing environment, a procedure valuable in assessing performance and simplifying calibration. Furthermore, by anodically discharging hydrogen from the palladium sensing element of the gauge, the palladium will much more readily reabsorb hydrogen after the anodizing procedure. Thus, the response of the device can be increased by the foregoing procedure.

In another aspect, the invention resides in the application of a cathodic current to the palladium to charge the palladium with hydrogen, thereby further increasing the response of the instrument. Finally, by the application of an anodic current to the palladium sensing element followed by the application of a cathodic current, the response of the instrument can be still further enhanced.

The above and other objects and features of the invention will become apparent from the following detailed description taken in connection with the acompanying drawings which form a part of this specification and in which.

Figures 1, 2, 3:
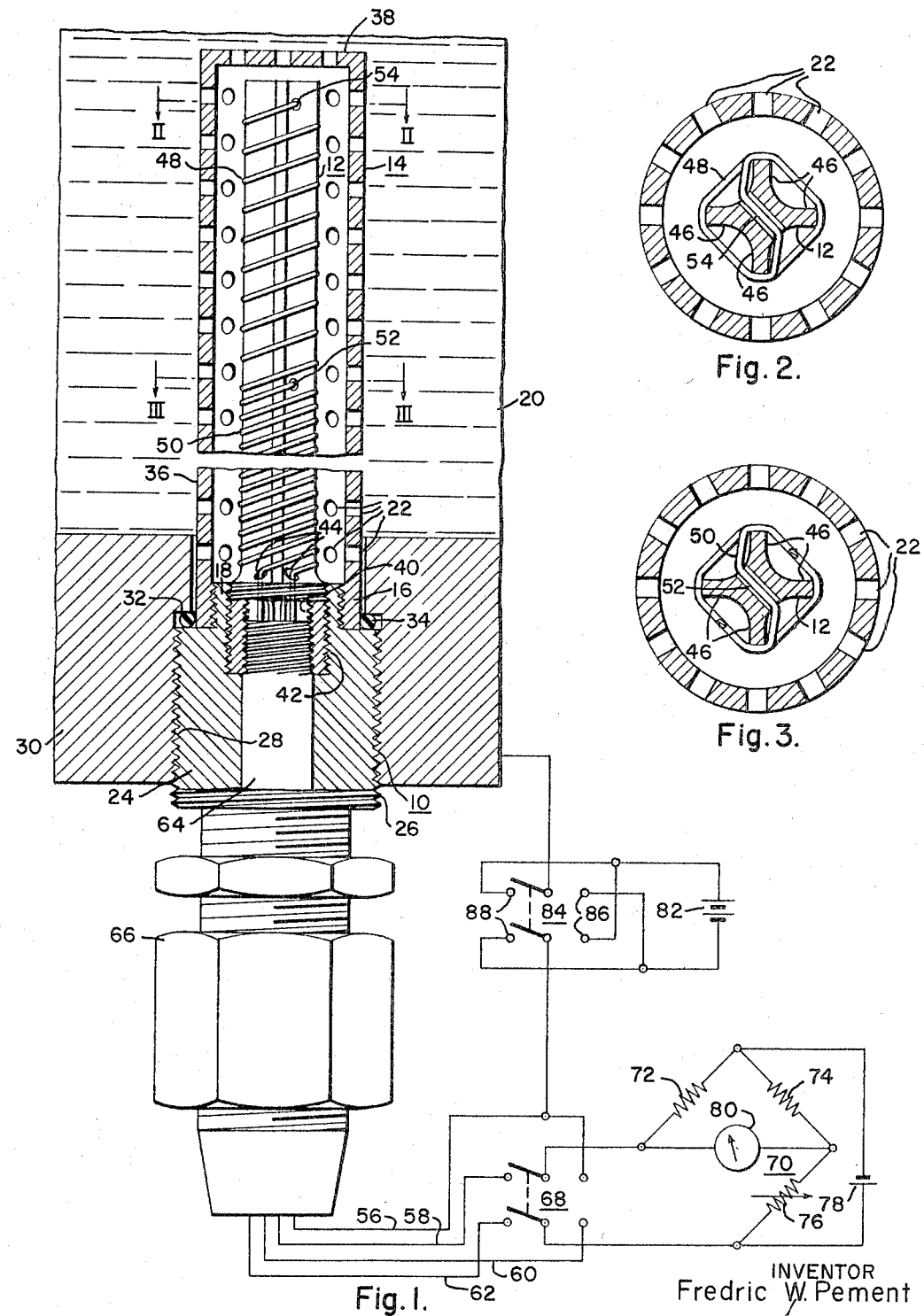
FIGURE 1 is a partially broken away cross-sectional view of the gauge of the invention.
FIG. 2 is a cross-sectional view taken along line II—II of FIG. 1.
FIG. 3 is a cross-sectional view taken along line III—III of FIG. 1.

Referring now to the drawings, and particularly to FIG. 1, the hydrogen gauge illustrated and arranged according to the teachings of the invention comprises a support and sealing means or packing gland 10, a mandrel 12, and a tubular perforated housing 14 into which the mandrel 12 extends. The housing 14 is threaded adjacent its output end 16 and is secured thereby to a forwardly extending tubular projection 18 of the packing gland 10. Desirably, the housing 14 is fabricated from a corrosion resistant material such as stainless steel, zirconium, or a zirconium alloy. The housing 14, moreover, is of such size that there is considerable space between it and the mandrel 12 so that a hydrogen-bearing medium 20, such as pressurized water, entering perforations 22 in the housing 14, will freely contact the outer surfaces of the mandrel.

The packing gland 10 is of conventional design, and the body portion 24 thereof is provided with an exterior thread 26 whereby the packing gland 10 in this example is engaged within an aperture 28 of the wall portion 30 of a vessel containing the hydrogen-bearing media under pressure. In the specific example given herein, it will be assumed that the media comprises pressurized water at elevated temperature containing dissolved hydrogen such as that in a nuclear reactor. However, as will hereinafter be seen, the principal requirement of the medium 20 is that it be electrically conducting and capable of containing dissolved hydrogen.

The aperture 28 is reduced at an inwardly extending shoulder 32 to provide a reduced-diameter portion through which the housing 14 and the mandrel 12 are inserted when the body portion 24 is thus fitted into the aperture 28. When positioned in this manner, the body member 24 of the packing gland 10 is sealed to the wall portion 30 by means of a sealing ring 34 inserted between the inward end of the body portion 24 and the shoulder 32 of the aperture 28.

As indicated heretofore, the housing 14 is provided with a plurality of holes or perforations 22 formed in the cylindrical wall 36 of the housing and also in the inward enclosure 38 of the housing. With this arrangement, the housing 14 protects the relatively fine wires, presently to be described, which are wound about the mandrel 12 while permitting ready access of the hydrogen-containing medium 20 to these wires.

The mandrel 12, in the example of the invention shown, is fabricated with a generally cruciform configuration as shown in FIGS. 2 and 3 and is furnished with a hollow generally cylindrical end portion 40 (FIG.1). The hollow end portion 40 is exteriorly threaded, and the mandrel 12 is supported relative to the housing 14 by threading the end portion 40 into a complementary, threaded cavity 42 of the packing gland body portion 24. The cruciform configuration of the mandrel likewise aids in facilitating contact of hydrogen-bearing media with the aforesaid wires. The mandrel 12 is provided with four circumferentially-spaced passageways 44, only two of which are shown in FIG. 1. These passageways communicate with the interior of the hollow end portion 40 and open upon the surface of the cruciform mandrel 12 between adjacent mandrel arms 46, these mandrel arms being best shown in FIGS. 2 and 3. Through these passageways 44 and through sealing means associated with the packing gland 10, the ends of the windings described hereinafter are brought out for connection to suitable electric resistance measuring circuitry.

In the particular embodiment of the invention shown herein, the mandrel 12 is provided with a pair of windings 48 and 50. These windings consist of wires which are wound upon the mandrel 12 and are disposed, as presently to be described in greater detail, within a four-start series of multiple thread-type grooves, that is to say, a series of grooves arranged in the form of four individual but parallel helices. Mandrel 12 has a pair of spaced openings 52 and 54 extending transversely therethrough, the outermost opening 54 being disposed adjacent the inward end of the mandrel 12. With this arrangement, the pair of wires 48 and 50 are wound individually in parallel helical relationship along the length of the mandrel 12. Each of the windings 48 and 50 is initially passed through a passageway 44, is inserted in an appropriate one of the aforesaid grooves, is wound along the length of the mandrel 12, is passed through the opening 52, or 54, respectively, (FIGS. 2 and 3) and is then doubled back on itself in a helical groove to the beginning of the winding at a point adjacent the cylindrical end portion of the mandrel. In this example, the individual turns of the shorter winding 50 lie respectively between adjacent turns of the other winding 48, as will be understood.

As shown in FIG. 1, the ends of each of the windings 48 and 50 are then passed through remaining ones of the passageways 44 where they are connected to individual electric leads 56, 58, 60 and 62, the leads 56 and 60 being from the one winding 48 and the other pair of leads 58 and 62 being from the other winding 50. The leads 56–62 extend through an elongated electrical insulating member 64 which, in turn, extends the length of the packing gland 10 as well as a coupling assembly 66, the details of which may be had by reference to the aforesaid U.S. Patent No. 3,040,561.

The wire 48, which is wound upon the mandrel 12 as aforesaid, is fabricated from a material such as palladium capable of absorption of hydrogen and having the property of changing electrical resistivity in proportion to the amount of hydrogen absorbed or adsorbed, as the case may be. The other mandrel winding 50 is formed from a material that does not absorb or dissolve hydrogen under the conditions of use, and whose resistivity therefore is not altered by environmental hydrogen. An example of such a material is platinum. The mandrel 12 is either formed from an electrically insulating material, such as fused or sintered aluminum oxide or other ceramic refractory oxide, or is provided with an insulating coating to avoid electrically shorting the adjacent turns of the windings 48 and 50, for example a zirconium metal member having a zirconium oxide coating therein. The wires from which these windings are formed are each drawn to about the same diameter which, in one example, may be of the order of a few mils in order to provide sufficient electrical resistance for adequate sensitivity of the hydrogen gauge.

As was mentioned above, it has been found that palladium can absorb dissolved hydrogen directly from a liquid solvent or other fluid media containing the same; and when the palladium is immersed within that solvent, the amount of absorbed hydrogen at equilibrium is proportional to the concentration of dissolved hydrogen. Since the hydrogen absorbed by the palladium wire 48 proportionately changes the electrical resistivity of that wire, the change in total resistance of a given length of palladium wire varies in proportion to the concentration of hydrogen in the solvent.

The resistance of the palladium wire 48 will vary not only as a function of the amount of dissolved hydrogen but also as a function of the temperature of the medium 20. It is for this reason that the second wire 50 is employed, this wire having the same temperature coefficient of resistance as that of the palladium wire 48. In the particular embodiment of the invention shown herein, the leads 56, 60 or 58, 62 are adapted to be connected through a double-pole, double throw switch 68 to a bridge circuit, generally indicated at 70. As shown, the bridge circuit includes three impedances 72, 74 and 76, the impedance 76 comprising a variable resistor. The fourth impedance of the bridge circuit comprises the winding 48 or 50, depending upon the position of the switch 68. A source of potential, such as battery 78, is applied across two of the terminals of the bridge circuit 70; while a meter 80 is applied across the other two terminals, the arrangement being such that any unbalance in the bridge will be indicated by an off-center reading of the meter 80. It will be understood, of course, that the specific bridge circuit arrangement shown herein is only one of several types of metering circuits which can be employed, other circuits being shown in the aforesaid U.S. Patent 3,040,561.

In the operation of the system, the switch 68 will be initially connected to the leads 58 and 62 which, in turn, are connected to the wire 50. The impedances or resistances 72 and 74 in the bridge circuit 70 are of the same value. Consequently, by adjusting the value of variable resistor 76 to balance the resistance of the wire 50 under the particular temperature conditions of the medium 20, the gauge 80 can be made to center or read at its zero condition. Thereafter, by reversing the switch 68, the reading of the gauge 80 will be an indication of the increase in resistance of the palladium wire 48 due to the hydrogen in the medium 20 alone, the resistance of the palladium wire 48 due to the temperature of the medium having been compensated for by the previous adjustment of the variable resistor 76.

As was mentioned above, the principle of operation of the gauge lies in the phenomenon that the palladium absorbs hydrogen to form a homogeneous single phase palladium-hydrogen solid solution at the normal operating conditions of the device, the increase in resistance of the palladium-hydrogen solid solution over the zero-hydrogen resistance being proportional to the amount of hydrogen in the palladium-hydrogen solid solution. However, under certain conditions of temperature and hydrogen concentration, the equilibrium palladium-hydrogen solid solution may consist totally or partially of a second phase, the $\beta$-phase, which is undesirable inasmuch as it changes the resistance of the wire 48 for a given hydrogen concentration. Hence, the calibration of the device is altered.

In accordance with the present invention, the hydrogen may be forced out of the palladium wire 48 by applying an anodic current between it and a suitable ground, such as the wall 30 of the vessel within which the medium 20 is contained, although the ground may comprise any conductor in contact with the medium 20. In order to effect this anodic current, it is, of course, necessary that the medium 20 be capable of conducting electric current; and, in the case of a hydrogen-bearing water solution, such solution must accordingly contain at least a small amount of dissolved electrolyte in order that a current can be made to flow to or from the palladium. In order to apply an anodic current to the palladium wire 48, a voltage source, such as a battery 82, may be employed. This battery may be connected through a double-pole, double throw switch 84 between the wall portion 30 and lead 56 through contacts 86 such that the palladium wire 48 is anodic with respect to the wall portion 30. Alternatively, the switch 84 may be reversed such that the battery 82 is connected through contacts 88 between lead 56 and the wall portion 30 such that the palladium wire 48 is cathodic with respect to the wall portion.

As mentioned above, hydrogen may be forced out of the palladium wire 48 by making it anodic with respect to the wall portion 30. On the other hand, the palladium wire 48 may also be charged with hydrogen by making it cathodic with respect to the wall portion 30.

In order that the palladium may be cathodically charged with hydrogen it is necessary that the medium 20, in addition to being electrically conducting, be capable of yielding hydrogen ions at a palladium cathode, an additional condition which is not necessarily required for the anodic discharge of hydrogen from the palladium (and which is not required for the normal absorption process of hydrogen by the palladium from the medium). Such an additional condition is met chiefly in aqueous solutions of electrolytes. Hence, the discussion of cathodic charging is properly concerned only with media of this nature. This restriction is not imposed upon the anodic charging of the palladium as the anodic charging of the palladium takes place whether the dissolved hydrogen is in ionic form or in molecular form. Readings are not taken from the meter 80 during the time that the battery 82 is connected into the circuitry. However, employing the battery 82 and by making the palladium wire 48 anodic with respect to the wall portion 30, the response or rapidity with which hydrogen is absorbed by the palladium wire 48 is increased. Furthermore, the response is increased each time the palladium is made anodic and can be further increased when the palladium is made cathodic.

In one specific example wherein the medium 20 comprised pressurized water containing dissolved hydrogen and dissolved lithium hydroxide so that the pH was 10 to 11, the palladium was made anodic at a current density of approximately two milliamperes per square centimeter of palladium. The device had responded to hydrogen in water at about 500° F., with an indicated hydrogen concentration of about 60 cubic centimeters of dissolved hydrogen per kilogram of water, referred to standard conditions (32° F. and 1 atmosphere pressure). The indicated palladium resistance was approximately 3.9% greater than its zero hydrogen resistance at the same temperature. The application of anodic current at the value cited caused the palladium resistance to reach approximately its zero hydrogen value in eight minutes or less.

Thus, in the operation of the device, the switch 68 will initially connect leads 58 and 62 (i.e., wire 50) to the bridge circuit 70 and the variable resistor 76 adjusted until the meter 80 zeros. This compensates for any change in resistance of wire 48 due to the temperature of the medium 20. Thereafter, the switch 68 is reversed, whereupon readings on meter 80 will be an indication of the hydrogen concentration of the medium 20. If the aforesaid undesirable or $\beta$-phase forms in the palladium wire 48, the readings on meter 80 will become erratic.

In order to establish zero hydrogen conditions in the palladium or to prevent formation of the $\beta$-phase in the palladium, in accordance with the invention, the switch 84 is engaged with contacts 86 whereby the wire 48 is anodic with respect to wall portion 30 in the manner described above. After a period of time of several minutes or less, the hydrogen will be forced out of the palladium; no hydrogen can enter the palladium as long as the palladium is maintained in such an anodic state. The $\beta$-phase could therefore not form even under conditions favorable to its formation in the absence of the anodic condition. When it is desired to allow the palladium again to respond to the dissolved hydrogen in the medium, as after restoration of environmental conditions not conducive to $\beta$-phase formation or after the determination of the zero-hydrogen palladium resistance, in situ, the switch 84 is disconnected from the contacts 86. Readings on the meter 80 can again be taken, and after sufficient time has been allowed for the palladium to absorb hydrogen to its equilibrium value, such readings will again be a direct measure of the dissolved hydrogen concentration in the medium 20.

As was mentioned above, continued or repeated applications of the anodic current to the palladium wire 48 decreases the amount of time for the palladium to reabsorb hydrogen. Furthermore, by connecting switch 84 to contacts 88 such that the palladium wire 48 is cathodic, absorption of hydrogen by the palladium wire 48 is accelerated, so long as hydrogen ions are present in the medium. Therefore, the time required for the wire 48 to assume a steady-state condition can be decreased by applying a cathodic current in the manner described above.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a hydrogen gauge, a member adapted to be disposed within an electrically conducting and ionizable hydrogen-bearing medium and fabricated from a material having the property of changing electrical resistance in response to changes in environmental hydrogen concentration, said member being subjected to a phase transformation under predetermined hydrogen conditions, means for measuring a change in resistance of said member in response to changes in environmental hydrogen, means for preventing said phase transformation comprising means for establishing an electric current through said medium between said member and a conductor in contact with said medium to alternately charge the member cathodically and anodically with respect to said conductor to alternately charge said member with hydrogen, and force hydrogen out of said member, respectively.

2. In a hydrogen gauge, a member adapted to be disposed within a hydrogen-bearing solution containing an electrolyte, said member being fabricated from palladium having a single phase alpha crystalline structure, means for measuring a change in resistance of said member in response to changes in environmental hydrogen in said solution, said member being subjected to a phase transformation under predetermined hydrogen conditions, means for preventing said phase transformation comprising means for establishing an electric current through said solution between said member and a conductor in contact with said solution to charge the member anodically with respect to said conductor to thereby force hydrogen out of said member, and means for establishing an electric current through said solution between said member and said conductor to charge the member cathodically with respect to said conductor to thereby charge said member with hydrogen.

3. The method of recalibrating a hydrogen detector immersed in an electrically conducting hydrogen containing fluid and including a wire having the property of changing resistance in response to changes in environmental hydrogen concentration, said method comprising the steps of applying a potential to said wire to charge the same anodically to force hydrogen out of said wire, and measuring the electrical resistance of said wire when said wire is so charged for determining its zero hydrogen resistance.

4. The method of calibrating and of improving the response rate of a hydrogen detector immersed in an ionizable hydrogen containing fluid and including a wire having the property of changing resistance in response to changes in environmental hydrogen concentration, said method comprising the steps of alternately applying a potential to said wire to charge the same anodically to force hydrogen out of said wire and cathodically to charge the wire with hydrogen, measuring the electrical resistance of said wire when said wire is charged anodically to determine its zero hydrogen resistance and measuring the electrical resistance of said wire when said wire is cathodically charged to determine the hydrogen concentration in said fluid.

5. The method of retarding the phase transformation of a hydrogen detector immersed in an electrically conducting hydrogen containing fluid and including a wire having the property of changing its electrical resistance with changes in the hydrogen concentration in said fluid formed at least in part from palladium having a single phase alpha crystalline structure and having the property of changing its crystalline structure when a predetermined amount of hydrogen has been absorbed thereby, said method comprising the steps of measuring the electrical resistance of said wire to determine the hydrogen concentration in said fluid, intermittently applying a potential to said wire to charge the same anodically to force hydrogen out of said wire to prevent the aforesaid phase transformation, and measuring the resistance of said wire when said potential has been removed.

References Cited by the Examiner
UNITED STATES PATENTS

| | | | |
|---|---|---|---|
| 1,421,720 | 7/1922 | Roberts | 73—23 X |
| 2,882,212 | 4/1959 | Beard | 73—23 X |
| 3,040,561 | 6/1962 | Wright | 73—23 |
| 3,147,204 | 6/1962 | Shepard et al. | 204—147 |

RICHARD C. QUEISSER, *Primary Examiner.*

J. FISHER, *Assistant Examiner.*